US008627333B2

(12) United States Patent  
Chen et al.

(10) Patent No.: US 8,627,333 B2
(45) Date of Patent: Jan. 7, 2014

(54) MESSAGE QUEUING WITH FLEXIBLE CONSISTENCY OPTIONS

(75) Inventors: Han Chen, White Plains, NY (US); Minkyong Kim, Scarsdale, NY (US); Hui Lei, Scarsdale, NY (US); Fan Ye, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 167 days.

(21) Appl. No.: 13/197,461

(22) Filed: Aug. 3, 2011

(65) Prior Publication Data

US 2013/0036427 A1     Feb. 7, 2013

(51) Int. Cl.
*G06F 3/00* (2006.01)

(52) U.S. Cl.
USPC .......................................................... 719/312

(58) Field of Classification Search
USPC .......................................................... 719/312
See application file for complete search history.

(56) References Cited

U.S. PATENT DOCUMENTS

| | | | | |
|---|---|---|---|---|
| 7,050,432 | B1 * | 5/2006 | Banavar et al. | 370/390 |
| 7,249,229 | B2 * | 7/2007 | Ogasawara et al. | 711/154 |
| 7,565,443 | B2 | 7/2009 | Rossmanith et al. | |
| 7,788,676 | B2 | 8/2010 | Caron | |
| 7,865,606 | B1 * | 1/2011 | Tewes et al. | 709/230 |
| 8,370,851 | B2 * | 2/2013 | Srinivasan et al. | 719/314 |
| 2006/0053425 | A1 | 3/2006 | Berkman et al. | |
| 2007/0073821 | A1 | 3/2007 | Brail | |
| 2008/0077939 | A1 | 3/2008 | Harran et al. | |
| 2008/0222255 | A1 | 9/2008 | Hall | |
| 2008/0307056 | A1 | 12/2008 | Videlov | |
| 2009/0228460 | A1 | 9/2009 | Martinez et al. | |
| 2010/0083278 | A1 | 4/2010 | Shirgaonkar | |
| 2010/0205271 | A1 * | 8/2010 | Callaghan | 709/206 |
| 2010/0235587 | A1 | 9/2010 | Noel | |
| 2011/0010340 | A1 * | 1/2011 | Hung et al. | 707/623 |
| 2011/0099233 | A1 * | 4/2011 | Calder et al. | 709/206 |
| 2011/0265095 | A1 * | 10/2011 | Cardona et al. | 718/105 |

OTHER PUBLICATIONS

IBM Technical Disclosure, "Dynamic Workload Balancing in Clustered Message Queuing Systems," IPCOM000124176D; Apr. 11, 2005, www.ip.com.

Ching-Shun, H., et al., "Knowledge Consistency Maintenance Architecture for Bullwhip Effect in Global SCM," 2008 Seventh Mexican International Conference on Artificial Intelligence, 978-0/7695-3441-1/08 copyright 2008 IEEE.

* cited by examiner

*Primary Examiner* — Emerson Puente
*Assistant Examiner* — Charlie Sun
(74) *Attorney, Agent, or Firm* — Jose Gutman; Fleit Gibbons Gutman Bongini & Bianco PL

(57) ABSTRACT

Embodiments of the invention relate to message queuing. In one embodiment, a request from an application for retrieving a message from a queue is received. The queue is stored across multiple nodes of a distributed storage system. A preference with respect to message order and message duplication associated with the queue is identified. A message sequence index associated with the queue is sampled based on the preference that has been identified. The message is selected in response to the sampling. The message that has been selected is made unavailable to other applications for a given interval of time, while maintaining the message in the queue. The message is sent to the application.

20 Claims, 10 Drawing Sheets

MESSAGE QUEUING WITH FLEXIBLE CONSISTENCY OPTIONS

BACKGROUND

The present invention generally relates to message queuing, and more particularly relates to message queuing with flexible consistency options.

Queuing, an asynchronous messaging paradigm, is used to connect loosely coupled components to form large-scale, highly-distributed, and fault-tolerant applications. Queuing decouples message producers from message consumers. Some current queuing systems try and offer queuing in a cloud computing environment. However, as a distributed storage system queuing is constrained by the CAP theorem by Brewer, which states that among the three qualities, consistency (C); availability (A); and network partition tolerance (P), only two can be achieved at the same time. As a cloud service, it is important to achieve A and P. This results in consistency being sacrificed. In the queuing context, consistency means that a message is delivered exactly once and in-order. Many conventional queuing systems provide at-least once delivery (no-loss) with no order. For applications that can tolerate out-of-order delivery, this semantic is sufficient for correctness. However, when these applications prefer in-order delivery this semantic is not sufficient.

BRIEF SUMMARY

In one embodiment, a method for managing message queuing is disclosed. The method comprises receiving a request from an application for retrieving a message from a queue. The queue is stored across multiple nodes of a distributed storage system. A preference with respect to message order and message duplication associated with the queue is identified. A message sequence index associated with the queue is sampled based on the preference that has been identified. The message is selected in response to the sampling. The message that has been selected is made unavailable to other applications for a given interval of time, while maintaining the message in the queue. The message is sent to the application.

In another embodiment, a message queuing system is disclosed. The system comprises a distributed storage system comprising and at least one information processing system communicatively coupled to the distributed storage system. The at least one information processing system comprises memory, a processor, and a messaging queuing system. The message queuing system is configured to perform a method. The method comprises receiving a request from an application for retrieving a message from a queue. The queue is stored across multiple nodes of a distributed storage system. A preference with respect to message order and message duplication associated with the queue is identified. A message sequence index associated with the queue is sampled based on the preference that has been identified. The message is selected in response to the sampling. The message that has been selected is made unavailable to other applications for a given interval of time, while maintaining the message in the queue. The message is sent to the application.

In another embodiment, a computer program product for managing message queuing is disclosed. The computer program product comprises a computer readable storage medium having computer readable program code embodied therewith. The computer readable program code comprises computer readable program code configured to perform a method. The method comprises receiving a request from an application for retrieving a message from a queue. The queue is stored across multiple nodes of a distributed storage system. A preference with respect to message order and message duplication associated with the queue is identified. A message sequence index associated with the queue is sampled based on the preference that has been identified. The message is selected in response to the sampling. The message that has been selected is made unavailable to other applications for a given interval of time, while maintaining the message in the queue. The message is sent to the application.

BRIEF DESCRIPTION OF THE SEVERAL VIEWS OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention, in which.

DETAILED DESCRIPTION

Figure 1:
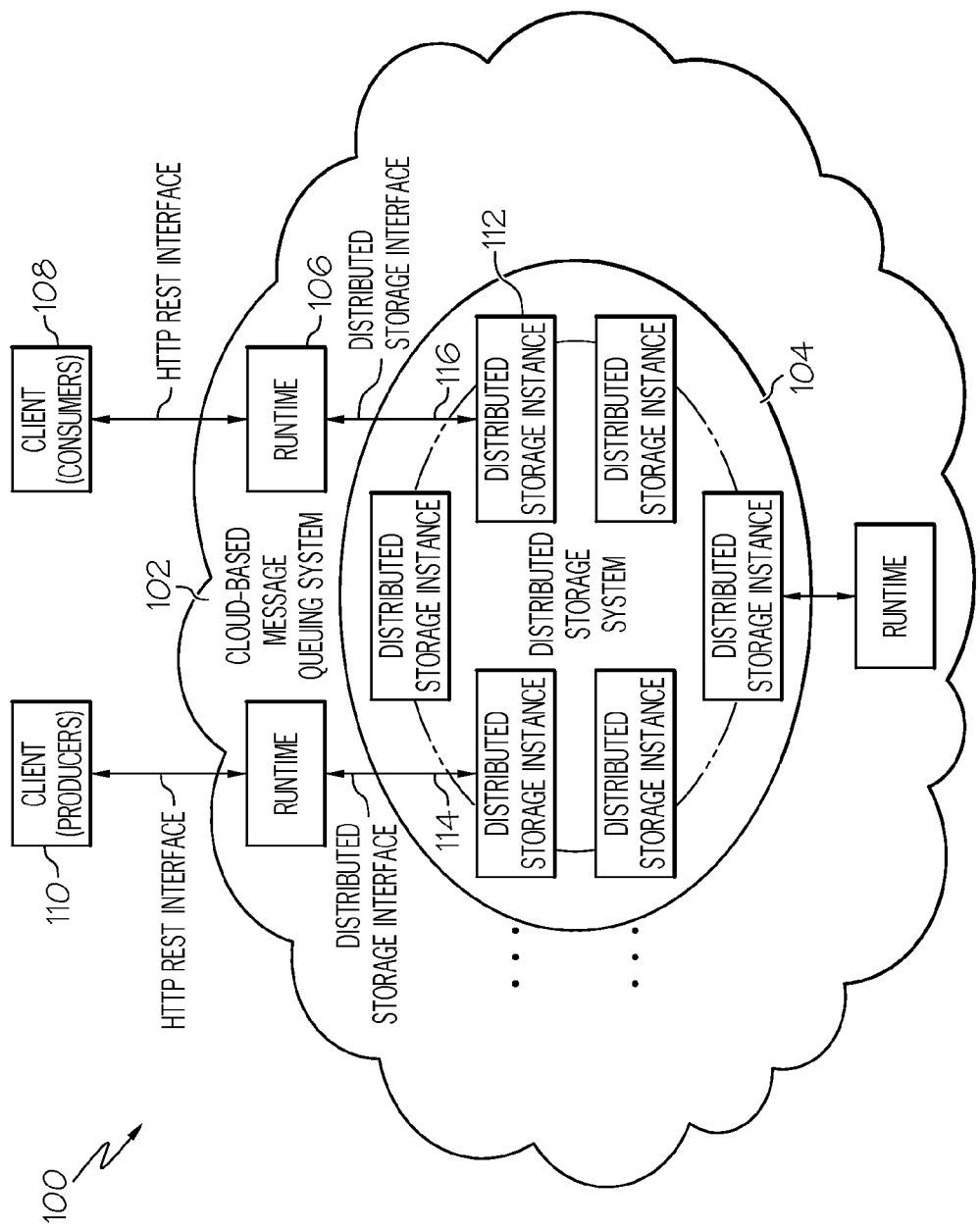
FIG. 1 is a block diagram illustrating one example of an operating environment comprising a message queuing system according to one embodiment of the present invention.

Service-Oriented Architecture (SOA) has been widely adopted by the information technology industry to build large-scale software applications. SOA uses the service abstraction to promote the principle of modular software design and development and thus enhancing software reusability. As SOA continues to evolve, asynchronous messaging technologies, such as queuing and publish/subscribe, are increasingly being incorporated into solutions. Message Oriented Middleware (MOM) complements and enhances SOA in at least three different ways. First, message queues are used as reliable communication channels for synchronous request-response interactions. Protocols such as SOAP over JMS maintain the remote procedural call syntax, but address the unreliability of HTTP. Second, solutions and processes are refactored to behave asynchronously. Using MOM as an intermediary, program components are decoupled from each other. The overall system can continue to function even in the face of component failure, thus providing improved reliability. Finally, messaging is deployed as a form of connectivity to support large-scale, loosely-couple, and distributed applications. Commonly used application patterns include workload dispatching/load balancing, MapReduce-like pipelined processing, and information aggregation and dissemination.

In order to reduce capital and operational expenses, the Information Technology industry is gradually adopting the cloud computing model. Several service providers now operate public, shared queuing services in the cloud, for example, Amazon Simple Queue Service (SQS) and Microsoft Windows Azure Queue. For reliability reasons, these systems choose to sacrifice consistency in favor of service availability and network partition tolerance. For queuing, reduced consistency means possible message loss, duplication, and out-of-order delivery. Existing systems adopt a consistency model of at-least once delivery (no-loss) with no order. This suffices for a number of applications. However, some applications, although tolerant of out-of-order delivery, still prefer in-order delivery so as to provide better service quality at application level.

Another trend in cloud computing is the emergence of Platform-as-a-Service (PaaS), which strives to simplify application development and deployment in the cloud. PaaS provides a higher-level of abstraction than bare metal VMs in Infrastructure-as-a-Service (IaaS). Applications are modeled as elastic deployment patterns of components (such as HTTP server, database, queuing, etc.) which the PaaS runtime monitors and controls. To support the aforementioned loosely-couple, event-driven applications in a PaaS environment, it is important to create a highly elastic, embeddable queuing component.

Therefore, one or more embodiments of the present invention provide a message queuing system that that supports both queuing and publish/subscribe services. In one embodiment, the queuing service provided by the system is a cloud-based queuing service, which meets the two requirements discussed above. The message queuing system, in one embodiment, is built on top of a distributed storage system and guarantees at-least once delivery and offers best-effort message order. A customizable parameter further allows users to specify the desired trade-off between message order and duplication. The system can be deployed as a scalable, shared cloud service. The system can also be embedded in PaaS applications as an elastic queuing component.

Operating Environment

FIG. 1 shows one example of an operating environment 100 for implementing a message queuing system of one or more embodiments of the present invention. In particular, FIG. 1 shows a message queuing system 102 being implemented within a cloud-computing environment. In one embodiment, the message queuing system 102 is a distributed system comprising a cluster of computer nodes as well. Implementing the message queuing system 102 in a cloud computing environment embodiment allows the message queuing system 102 to provide cloud-based message queuing services. However, it should be noted that embodiments of the present invention are not limited to cloud computing environments. Rather, various embodiments of the present invention are capable of being implemented in conjunction with any other type of computing environment now known or later developed.

In the embodiment shown in FIG. 1, the message queuing system 102 is coupled to an underlying distributed storage system 104 that provides distributed persistence across a cluster of computer nodes. It should be noted that the distributed storage system 104 is also referred to herein as a "persistence system", which provides reliable object store. Various distributed storage systems can be utilized by the message queuing system 102 such as, but not limited to, Apache Cassandra, WebSphere® eXtreme Scale, etc. The message queuing system 102 provides runtime instances 106 that allow various clients 108, 110 to interact with the message queuing system 102. In one embodiment, clients 108, 110 interact with the message queuing system 102 utilizing an interface 114 such as, but not limited to, a Hyper Text Transfer Protocol (HTTP) based application programming interface (API) that uses a Representational State Transfer (REST) mapping.

A runtime instance 106 of the message queuing system 102 interacts with an instance 112 of the distributed storage 104 via a distributed storage interface 116 such as, but not limited to, a Thrift interface. The above configuration of the environment 100 allows the message queuing system 102 to be highly available and partition tolerant; offer best-effort in-order delivery and no-loss guarantee (at-least-once delivery); and deployable either as a shared service or as a component in a PaaS application.

System Architecture

Figure 2:
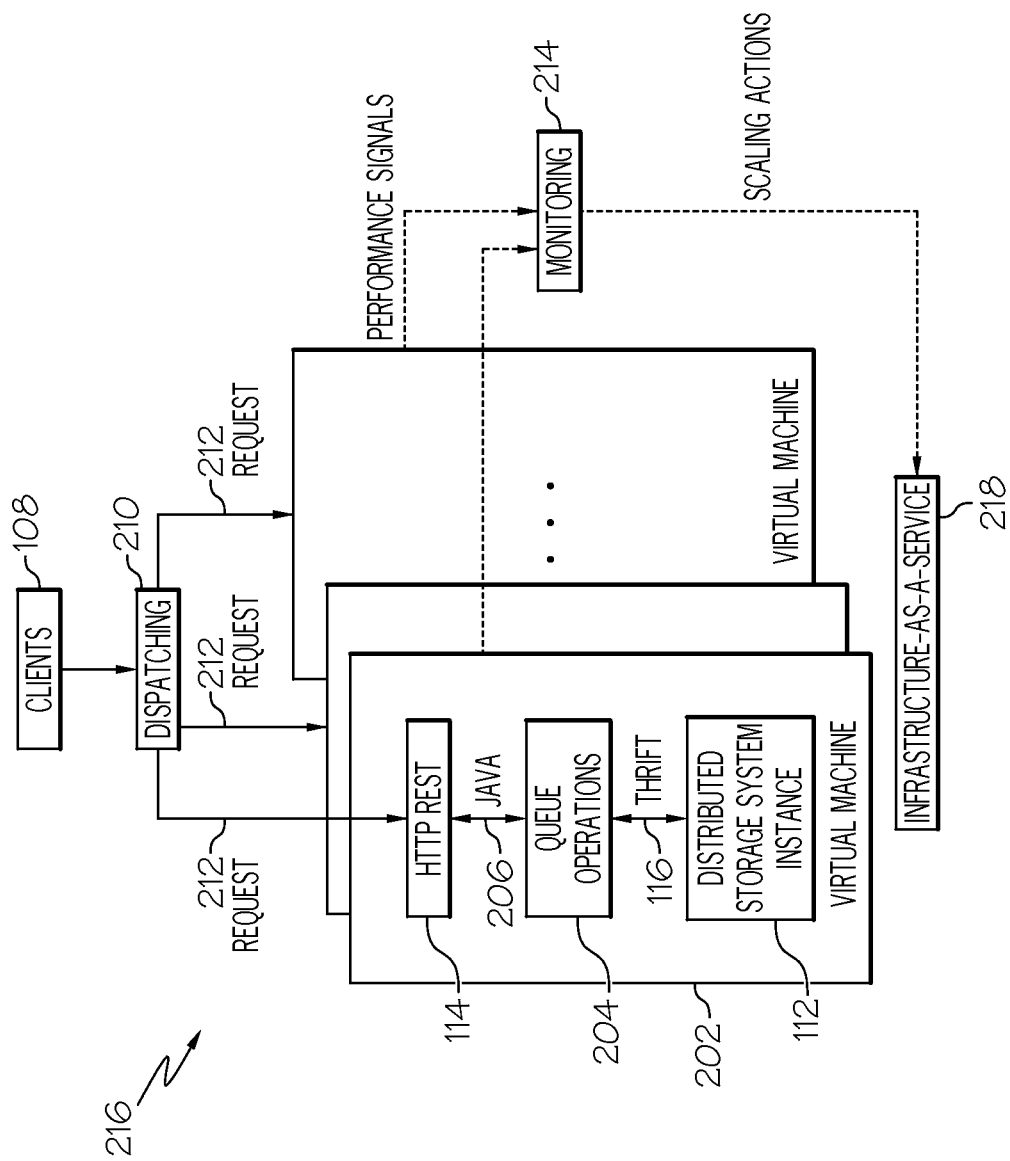
FIG. 2 shows a detailed view of a system architecture for the message queuing system of FIG. 1 according to one embodiment of the present invention.

A more detailed discussion is now given with respect to the system architecture of the message queuing system 102. Distributed persistence is provided by the distributed storage system 104. A queue operations component 204 (FIG. 2) (represented by the runtime 106 in FIG. 1) implements a queue API using a distributed storage system API. To maximize overall system throughput, the queue operations component 204 is configured to store all states in the distributed storage/persistence layer and does not maintain state information itself. Therefore, multiple instances can be deployed to support concurrent client access. The queue operations component 204 exposes its functionality through a native API. To enable a wide variety of clients to access the service, an HTTP REST component 114 provides a RESTful (conforming to REST constraints) interface of the native queue API via HTTP binding.

The queue operations component 204 also comprises components (not shown) such as a data model mapping component, a message store component, a message sequence component, a message visibility component, and a message retrieval component. The data model mapping component maps the queues and messages to a data model that is suitable for the distributed storage system 104. The message store component supports message enqueuing operations. The message sequence component manages the order of messages for the queues that prefer delivery order. The message visibility component manages the temporary hiding of messages that are received, but not deleted. The message retrieval component selects the appropriate message for a message retrieval operation. These operations are discussed in greater detail below.

In a shared service deployment, a virtual machine (VM) image 202 comprises one instance of each component 112, 114, 204 discussed above, as shown in FIG. 2. In one embodiment, the message queuing system 102 comprises a cluster of computer nodes comprising an instance 112 of the distributed storage system 104 and an instance of the queue operations component 204, thereby creating a distributed system.

There are two processes 206 that allow the queue operations component 204 to communicate with the REST interface 114. In one embodiment, the distributed storage system instance 112 runs in its own address space. It should be noted that the distributed storage system instance 112 can also be implemented within its own VM as well. A separate HTTP container hosts the REST interface 114 and the queue operations 204. The queue operations component 204 accesses the distributed storage system instance 112 via a local interface 116.

A dispatching mechanism 210 routes incoming client requests 212 to the REST interface instance 114. This can be achieved using either a dedicated front-end HTTP router or round-robin DNS. To provide adequate service level to clients 108, a separate monitoring mechanism 214 controls the dynamic scaling (e.g., instantiation of additional nodes or removal of nodes) of the VM cluster 216. There are two different reasons for scaling the system 102. First, more storage capacity is needed to handle increased number of queued messages. Second, more VMs are required to cope with increased request rate from clients. The monitor 214 collects information about current storage size and average response time; decides if the system 102 should be scaled up or down; and interacts with the IaaS 218 layer to carry out these actions.

Figure 3:
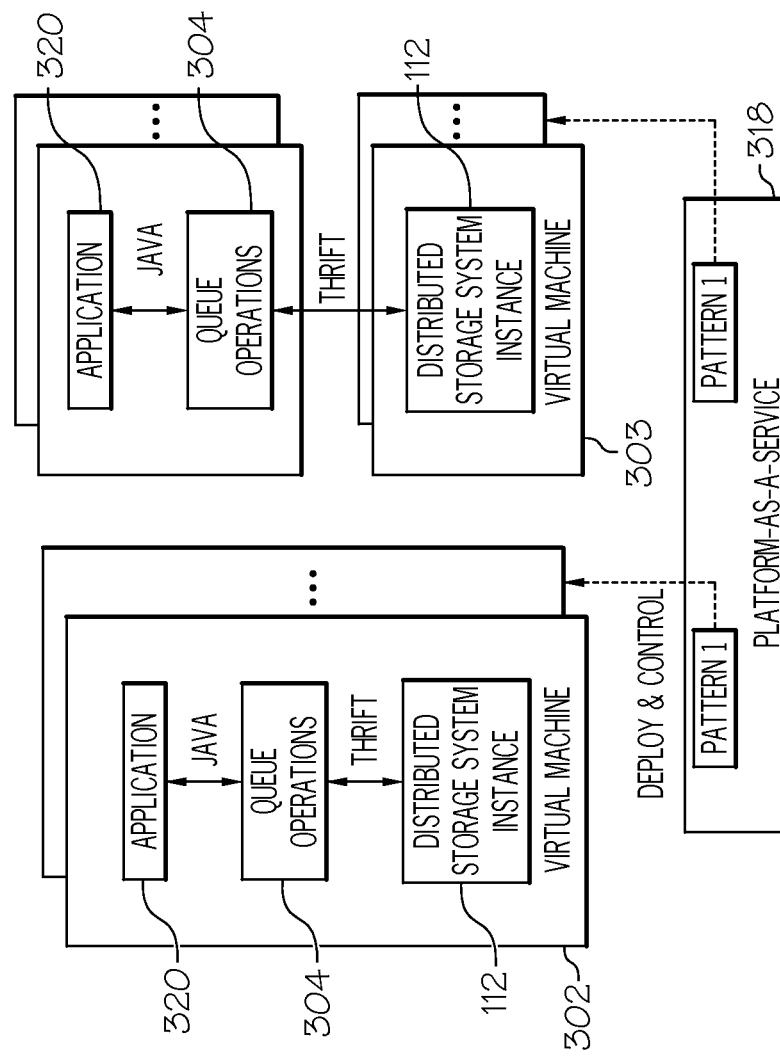
FIG. 3 shows another detailed view of a system architecture for the message queuing system of FIG. 1 according to another embodiment of the present invention.

FIG. 3 shows another embodiment directed to a PaaS application deployment. When used as a component in a PaaS application, the queue operations component 304 can be embedded in-process in the application logic, so that it can interact with the queuing layer directly via its native API. The distributed storage system instance 112 still runs in a separate address space in the same VM 302. In this deployment pattern, the storage capacity and throughput capacity of the queuing component 304 increase along with the application 320. In a more flexible pattern, the distributed storage system instance 112 can be deployed on a separate VM image 303, whose instance number may be adjusted independently from that of the application logic. This allows a finer grained capacity control. In either case, the PaaS layer 318 controls the number of instances for each type of VM images 302, 303, according to predefined service level.

Queue Operations Interface

The message queuing system 102, via the queue operations component 204, provides a queue interface that deals with message operations. The design goals of this queuing interface are to provide at-least once (no-loss) guarantee over potentially unreliable HTTP and to support best-effort in-order delivery. The queue operations component 204 supports an enqueue operation such as SendMessage, which places a message on a given queue. When the message is returned, the message is guaranteed to be persisted. Receive-Message attempts to retrieve the oldest messages in the queue. These messages are returned to the client, but are not immediately deleted. These messages are locked and made invisible to subsequent ReceiveMessage calls during a time window herein referred to as "visibility timeout". After successfully processing the messages, a client issues DeleteMessage request before the timeout occurs to actually delete the messages. If the timeout occurs before the DeleteMessage call is received, the messages reappear in the queue. This visibility timeout mechanism provides a lightweight transaction over HTTP with automatic rollback specified by the timeout value.

To support multi-tenancy in a shared service deployment, the message queuing system 102 uses the concept of accounts. The queuing interface discussed above provides various operations such as CreateAccount, ListAccounts, and DeleteAccount. Within an account, a client can manipulate queues using operations such as CreateQueue for creating a queue, ListQueues for listing available queues, DeleteQueue for deleting a given queue (where any metadata, message sequence index for the queue, and any remaining messages in the queue are deleted from the distributed storage system 104). As will be discussed in greater detail below, an application (through the queuing interface) can supply a preference for tradeoff between message delivery order and duplication for each queue object during creation of a given queue.

Distributed System Data Store Configuration

Figure 4:
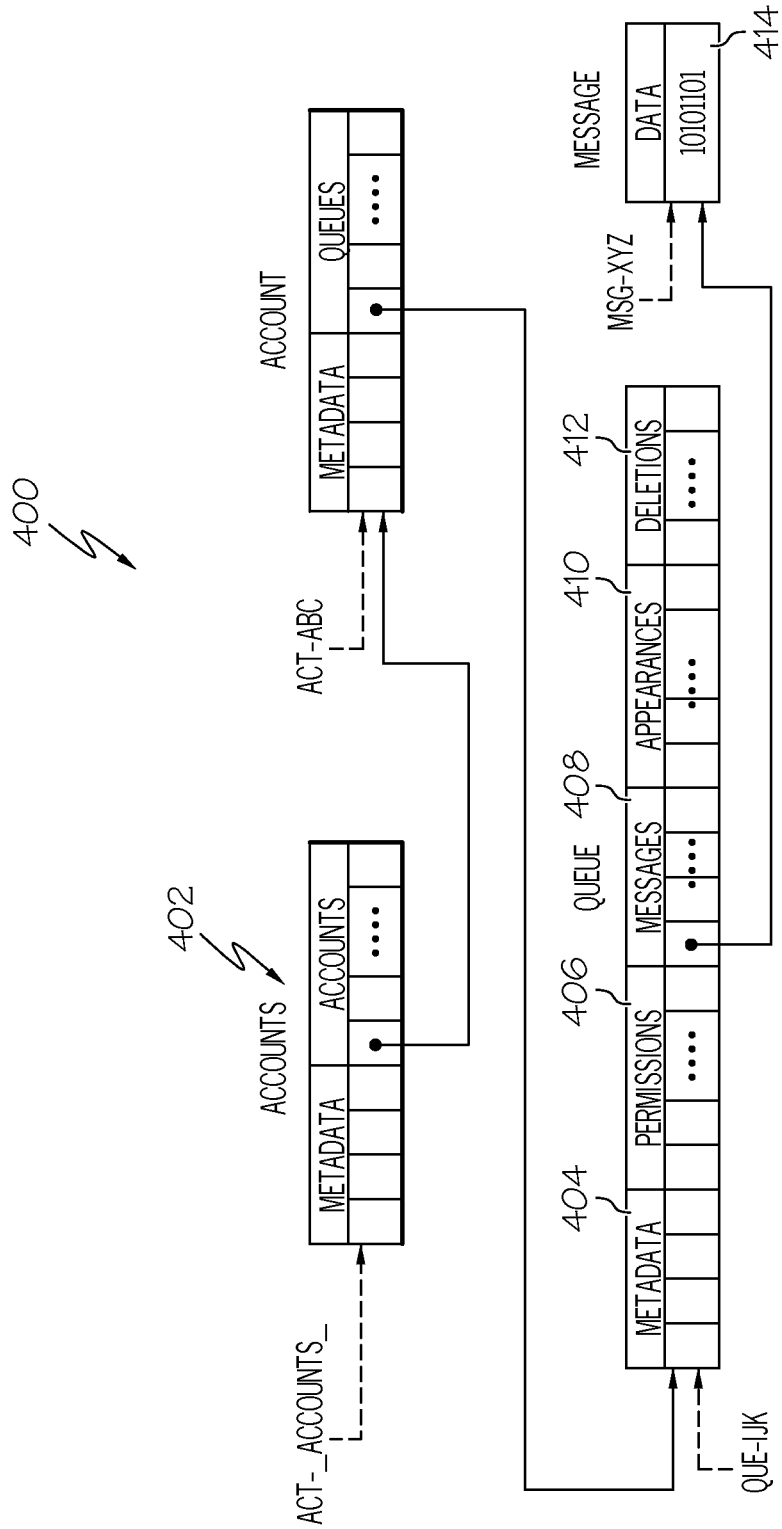
FIG. 4 shows one example of a distributed storage system data store model detailed view of the a message queuing system architecture according to one embodiment of the present invention.

In one embodiment, the queuing operations component 204 also maps the queues and messages to a data model suitable for the distributed storage system 104. One example of a mapping 400 is shown in FIG. 4. There are three main resource types in the message queuing system 102: account, queue, and message. These resources are stored as distributed storage system 104 rows (shown in FIG. 4). Each row is uniquely identified by a key that takes the form of XYZ-id, where XYZ is a three character prefix and id is created by computing the base64 encoded string of 160-bit SHA 1 hash of a human readable unique name. This configuration distributes the data across the entire distributed storage system 104 cluster and allows direct access to any objects without having to search through multiple levels of indirection.

Accounts 402 is the root object holding references to all accounts. This is a singleton with key ACT-_ACCOUNTS_. The account index is stored in column family Accounts, in the form of (AccountName, AccountKey). The shorthand (n,v,t) denotes a distributed storage system 104 column with name n, value v, and timestamp t. When timestamp is unimportant to the configuration, it may be omitted for succinctness.

The prefix of account key is ACT and the id is the hash of the account's name, which is unique across the system. There are two column families: Metadata and Queues. The former comprises account information such as owner's name, console logon password, secret key, etc. The latter contains reference indices to the queues in the account, in the form of (QueueName, QueueKey). The prefix of queue key is QUE and the id is the hash of the fully qualified and unique queue name in the form of AccountName.QueueName. As the cornerstone of the queuing system design, several column families are defined, whose uses are described in details in subsequent sections.

Metadata 404 stores information about the queue. The main items of interest are the default visibility timeout and the consistency level hint. Permissions 406 stores access control related information, which will not be discussed in the paper. Messages 408 stores an index of all messages in the queue in the form of (MessageKey, Handle, Timestamp). Appearances 410 stores the scheduled appearance time of each message, in the form of (Timestamp-Handle, MessageKey). The shorthand A-B means the concatenation of string A, a dash (-), and string B. Deletions 412 stores scheduled deletion time of each message, in the form of (Timestamp-Handle, MessageKey). The prefix of message key is MSG and the id is the hash of a globally unique Id. There is one column family, Data 414, which contains a single column (Content, bytes), where bytes is the actual message content.

In one embodiment, there is a special account with the reserved name _SYSTEM_. This special account comprises three queues, AccountGC, QueueGC, and MessageGC. When an account is deleted, a queue is deleted, or a message expires, a request is put into the corresponding queue, which is received by a background garbage collector that performs the actual cleanup of the relevant data structure.

Message Queuing

A more detailed discussion is now given with respect to the message queuing operations of the message queuing system 102. Given the data store schema of the distributed storage system 104 discussed above, the message queuing system 102 realizes the queue operations by manipulating the stored data. Conceptually, realizing the visibility timeout requires maintaining a timer for each received-but-not-yet-deleted message in the system. However, a direct and naive implementation requires keeping a large number of timer events in memory, which incurs processing overhead and complicates failure recovery because the timers are in-memory states. Therefore, the message queuing system 102 uses a timestamp-based ordering algorithm (using, in one embodiment, the Appearances 410 column family of a queue) to realize timer management for visibility timeout and best-effort in-order delivery together. By using a timestamp-based ordering algorithm the message queuing system 102 does not require separate storage for locked messages and the need for time threads is eliminated.

Figure 5:
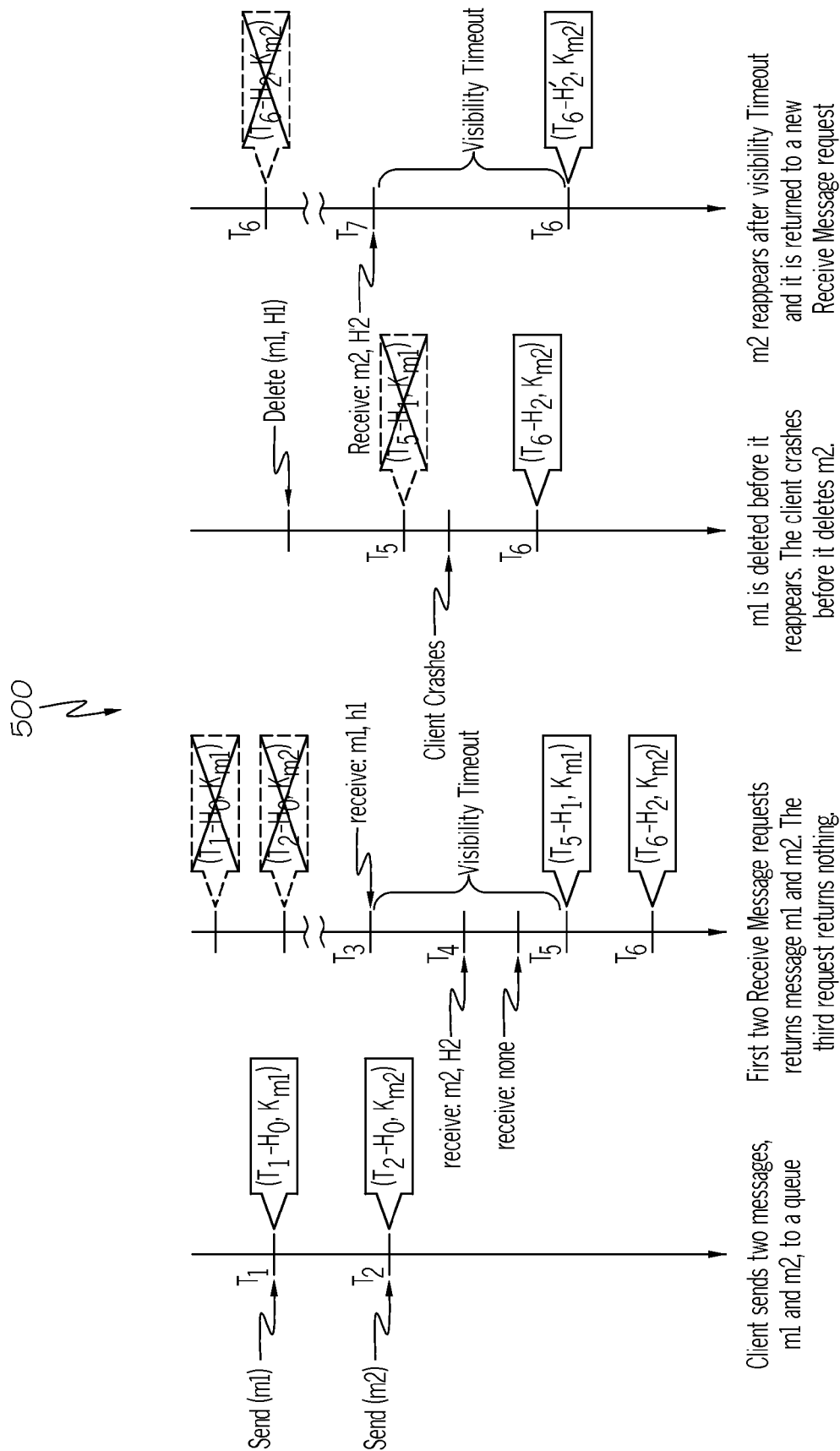
FIG. 5 shows one example of a sequence of operations for implementing a visibility timeout feature of the message queuing system of FIG. 1 according to one embodiment of the present invention.

For example, consider the sequence of queue operations 500 shown in FIG. 5. When SendMessage is invoked, the system 102 creates a new unique message key $K_{msg}$ and a dummy handle (a unique string) $H_{dummy}$. Let $T_{now}$ be the current time. A column ($K_{msg}$, $H_{dummy}$, $T_{now}$) is inserted to the Messages column family of the given queue. This column in the form of (id, handle, timestamp) is also referred to as a message sequence index object.

The system 102 then inserts a column ($T_{now}$–$H_{dummy}$, $K_{msg}$) into the Appearances column family. This indicates to the system that this particular message becomes visible (appears) at $T_{now}$, that is, it can be received immediately. The content of the message itself is stored in a message row keyed by $K_{msg}$. Note that, because the Appearances column family is sorted by column name, this preserves the message order for later delivery. FIG. 5 shows an example where a client sends two messages m1 and m2 to a queue. Message m1 is sent at time T1 and message m2 is sent at time T2. Therefore, based on the above, a column ($T_1$–$H_0$, $K_{m1}$) is inserted for message m1 and a column ($T_2$–$H_0$, $K_{m2}$) is inserted for message m2.

When ReceiveMessage is invoked, the system 102 retrieves the first column in the Appearances column family, (T–H,$K_{msg}$). Because the column family is sorted by column name, $K_{msg}$ refers to the oldest message that is currently in the queue. If $T \leq T_{now}$, this message is available to be returned. The appearance column (T–H,$K_{msg}$) is removed from the Appearances column family. A new appearance column (T'–H',$K_{msg}$) is inserted, where T'=$T_{now}$+$T_{vto}$ ($T_{vto}$ is the visibility timeout value), and H' is a unique handle that will be returned to the client as the receipt handle for this message. The corresponding column in the Messages column family is also updated with ($K_{msg}$,H',T'). If T>$T_{now}$, it means that all messages in the queue are currently locked, and therefore the queue is empty and nothing is returned. For example, FIG. 5 shows that at times T3 and T4 two ReceiveMessage requests are received, one for message m1 and one for message m2. A new appearance column ($T_5$–$H_1$, $K_{m1}$) is inserted for message m1 and ($T_6$–$H_1$, $K_{m2}$) for message m2. In this example $T_{vto}$ was equal to 2.

When DeleteMessage is invoked, the system 102 obtains the message key $K_{msg}$ and the receipt handle H from the client request. The system 102 verifies that column ($K_{msg}$, H, T) is in the Messages column family. The system 102 then deletes the appearance column (T–H, $H_{msgs}$) from the Appearances column family. For example, FIG. 5 shows that message m1 is deleted prior to the visibility timer expiring. Therefore, the message m1 is no longer available in the queuing system. However, if a DeleteMessage request is not received before the visibility timer expires the message is made available to another ReceiveMessage request. For example, FIG. 5 shows that the client currently processing message m2 has crashed and a DeleteMessage request was not received prior to the visibility timer expiring. Therefore, the system 102 makes message m2 available once again in the queue and subsequently returns message m2 to a client in response to receiving s ReceiveMessage received at time T7.

This algorithm seamlessly integrates visibility timeout and best-effort in-order delivery. As can be seen from the above discussion, message order is recorded in an index on a per queue basis. Actual messages are distributed across all nodes in the system. All states are persisted across sessions. Therefore the system can survive node failures and still provide high availability.

The system architecture uses multiple queue operations components to serve client requests concurrently. In order to maximize system throughput and increase reliability, no distributed locks are used among these component instances. The result is that, when multiple clients invoke ReceiveMessage operation on the same queue object using different entry points into the system, the same message may be returned to these clients. From a correctness point of view, this does not violate the at-least once delivery model. However, it may be desirable to reduce the number of duplicate messages.

Therefore, the message queuing system 102 uses a collision avoidance algorithm to balance the probability of duplicates and the message delivery order. The change to the above algorithm involves only the ReceiveMessage operation. Instead of always retrieving the first appearance column, the system will retrieve a random column among the first K appearance columns. The larger the value of K, the less likely that concurrent receivers will obtain the same message, but the more out-of-order the returned message sequence will be. The system exposes the value of K as a configurable parameter for each queue, where a client or an admin of the system can specify the value of K. A value K=1 produces the best order with potential duplications, whereas a large value of K (e.g., K>1) reduces duplication. Additionally, the value of K can be set for each individual request as well.

As discussed above, data consistency in a queue means in-order and exactly-once delivery. It is possible to achieve this in a distributed environment if locks are used. Particularly, this means setting the read/write consistency level combination to one of the following, ONE/ALL, QUORUM/QUORUM, or ALL/ONE, and using distributed locks among the queue operations components. However, this reduces the system availability, because a node failure will cause queue operations to block indefinitely.

The message queuing system 102, in on embodiment, uses the lowest level of data consistency, ConsistencyLevel.ONE, for all read and write operations and employs no distributed locks in the queue operations layer. This gives the system the best possible performance, in terms of throughput and latency; it also provides the highest level of availability and partition tolerance, which are all highly desirable features for a cloud based service. In one embodiment, the above algorithm can be further refined to cope with the potentially inconsistent data. In particular, during ReceiveMessage operation, an Appearances column and a Messages column may represent snapshots of the queue at different time. Therefore, the algorithm can be refined to consider all possible data propagation sequences among the distributed storage system replicas and deal with each of them accordingly. Also, a distributed storage system replica may go down temporarily while accounts, queues, or messages are deleted. Therefore, it is important to have a mechanism to reconcile the difference when these replicas are back online. For this reason, garbage collection is used for all deletion operations. The grace period for garbage collecting a deleted resource is set to be long enough to accommodate any repair time of a downed storage node of the distributed storage system 104.

Operation Flow Diagrams

Figure 6:
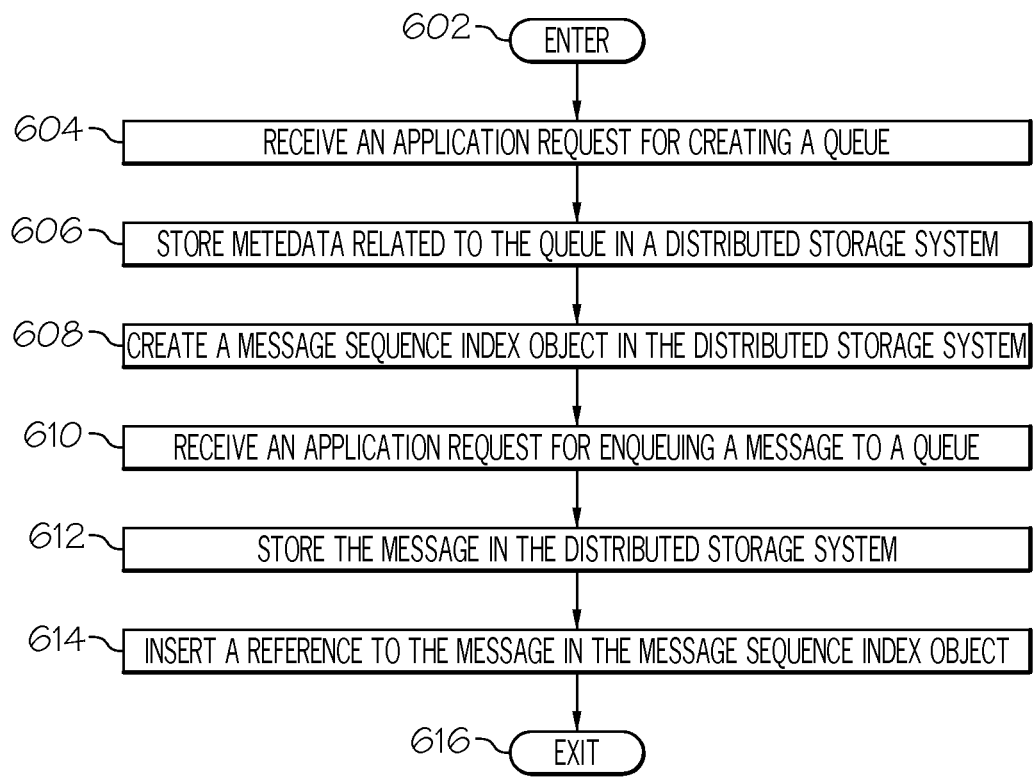
FIG. 6 is an operational flow diagram illustrating one example of managing messaging queues according to one embodiment of the present invention.

FIG. 6 is an operational flow diagram illustrating one example of a process for managing queues according to one embodiment of the present invention. The operational flow diagram of FIG. 6 begins at step 602 and flows directly to step 604. The message queuing system 102, at step 604, receives an application request for creating a queue. This request, in one embodiment, comprises a preference for a tradeoff between message order and duplication. This preference can be specified as a discrete set of choices such as, but not limited to, "Favor order", "Favor non-duplication", "Balanced", etc. Alternatively, this preference can be specified as a numeric value such as, but not limited to, "1" for order, "∞" for non-duplication, and other values for tradeoff in between.

The message queuing system 102, at step 606, stores metadata related to the queue in a distributed storage system 104 (persistence system) and creates a message sequence index object in the distributed storage system 104 if the tradeoff preference favors order. The message sequence index object, in one embodiment, is a list of tuples in the form of (id, handle, timestamp), where id is the message id, handle is a unique number, and timestamp is the time that the message becomes available for retrieval. This list of tuples can be sorted by ascending order of timestamp and handled (or by any other organization mechanisms).

The message queuing system 102, at step 608, receives an application request for enqueuing a message to a queue. In one embodiment, the message queuing system 102 enqueues a message by inserting a tuple (id, handle, timestamp) into the queue. The message queuing system 102, at step 610, stores the message in the distributed storage system 104. The message queuing system 102, at step 612, inserts a reference to the message in the message sequence index object if available. The control flow then exits at step 614.

Figure 7:
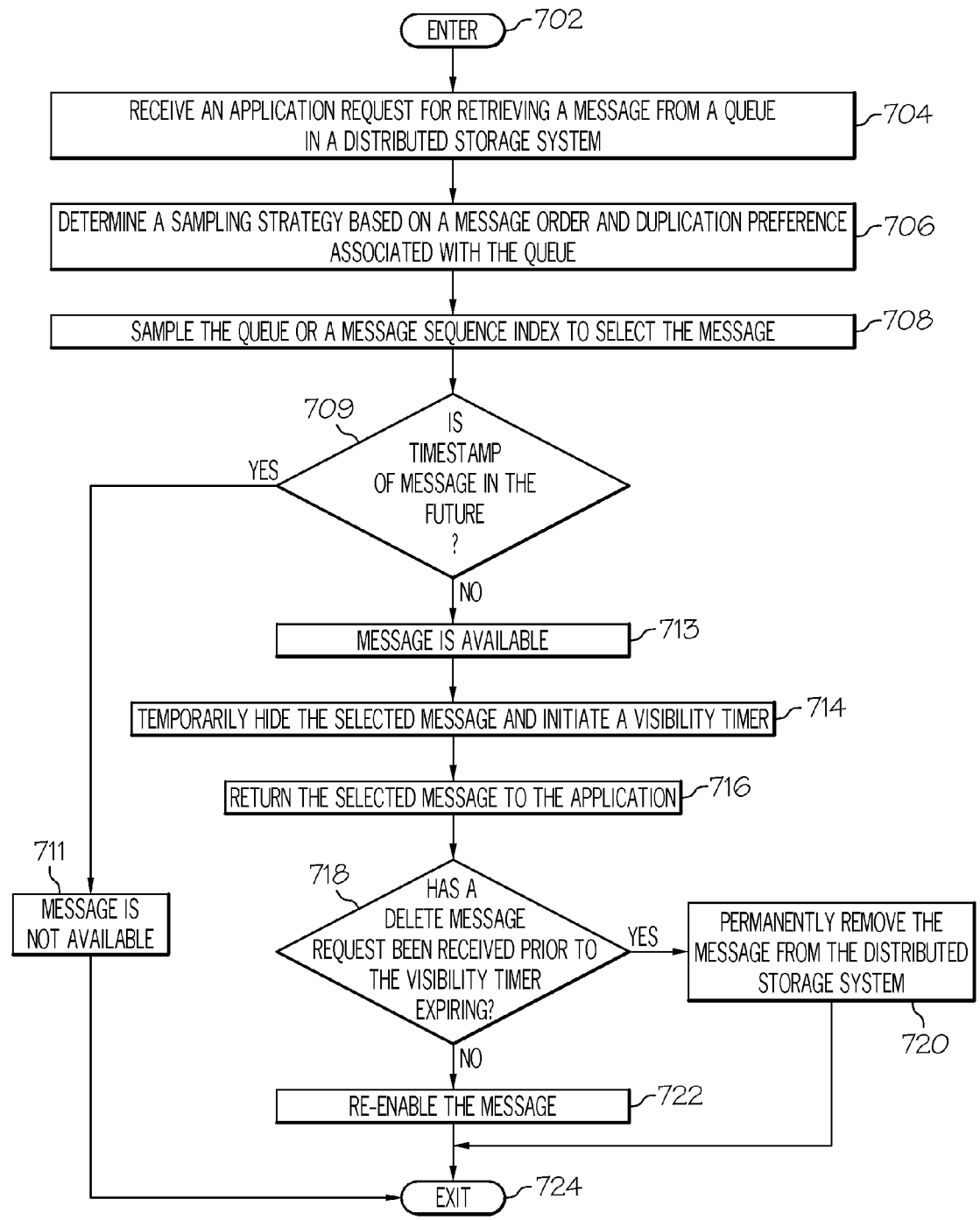
FIG. 7 is an operational flow diagram illustrating one example of managing messages in queues according to one embodiment of the present invention.

FIG. 7 is an operational flow diagram illustrating one example of a process for managing messages in queues according to one embodiment of the present invention. The operational flow diagram of FIG. 7 begins at step 702 and flows directly to step 704. The message queuing system 102, at step 704, receives an application request for retrieving a message from a queue.

The message queuing system 102, at step 706, determines a sampling strategy based on a tradeoff preference associated with the queue. For example, the message queuing system 102 can look up the preference in the queue itself. A positive integer value K is then calculated based on the preference, where K=1 corresponds to the strongest favoring order and K=+∞ corresponds to the strongest favoring of non-duplication. If K=+∞ the message queuing system 102 samples a random distributed storage system node for a message belonging to the queue. Otherwise the message queuing system 102 samples a random message reference from the first K objects in the message sequence index of the queue and retrieves the message content from the distributed storage system 104 using the sampled message reference.

The message queuing system 102, at step 708, samples the queue or the message sequence index and selects a message. When retrieving the message, the message queuing system 102 selects a tuple (id, handle, timestamp). The message queuing system 102, at step 709, determines if the timestamp is in the future. If the result of this determine is positive, the message, at step 711, is determined to not be available and the message is not returned to the application. If the result of this determination is negative, the timestamp identifies a current point in time or a past point in time, and the message, at step 713, is determined to be available.

The message queuing system 102, at step 714, temporarily hides the selected message and initiates a visibility timer. For example, the message queuing system 102 removes the tuple (id, handle, timestamp) associated with the selected message and inserts a new tuple (id, handle, now+timeout) into the queue. The message queuing system 102, at step 716, returns the selected message to the application. The message queuing system 102, at step 718, determines if delete message request has been received prior to the visibility timer expiring (or a threshold associated with the time being reached). If the result of this determination is positive, the message queuing system 102, at step 720 permanently removes the message from the distributed storage system 104. If the result of this determination is negative, the message queuing system 102, at step 722 re-enables the message in the queue after the visibility timer expires. The control flow then exits at step 724.

Information Processing System

Figure 8:
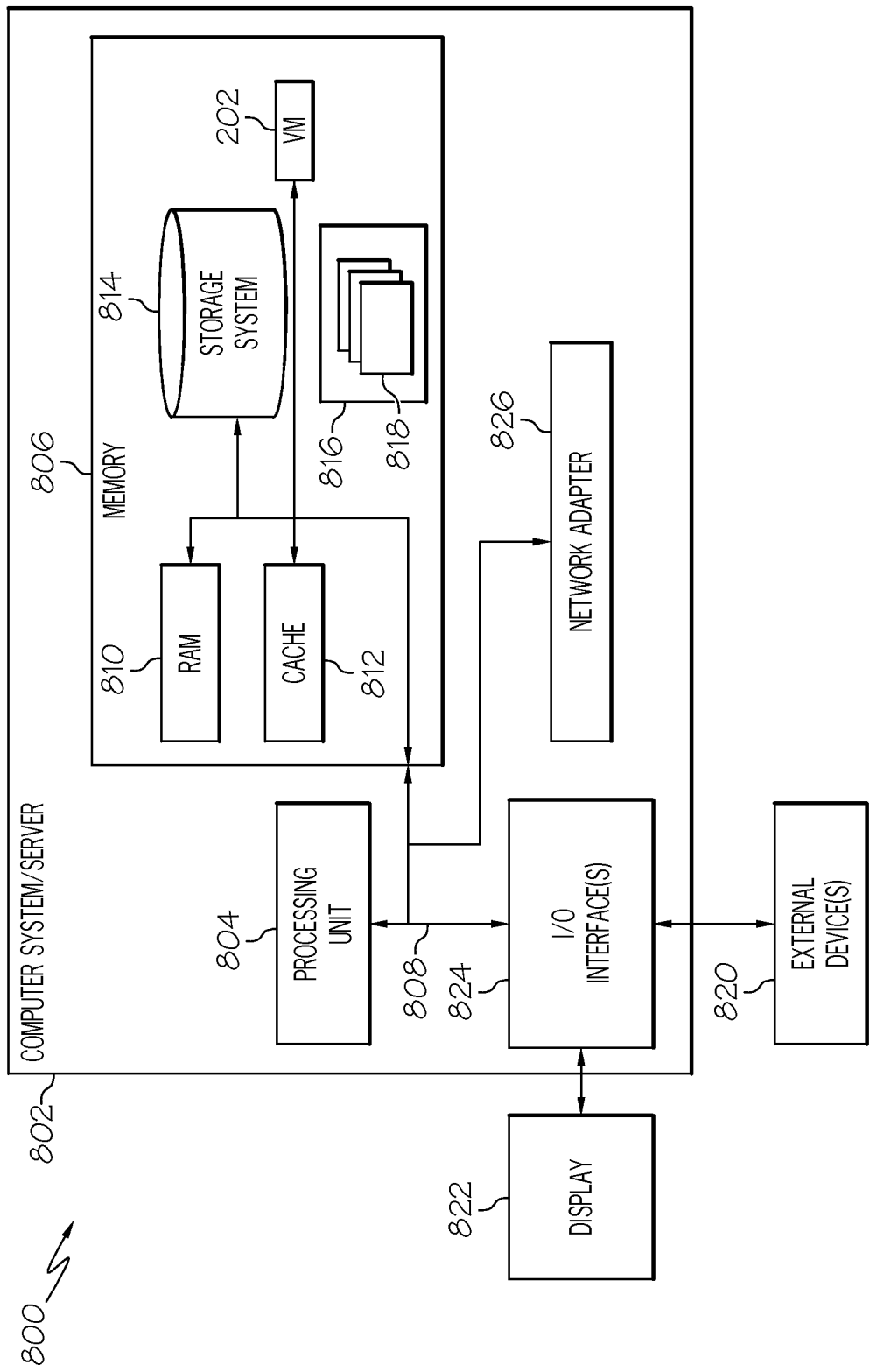
FIG. 8 illustrates one example of a cloud computing node according to one embodiment of the present invention.

Referring now to FIG. 8, a schematic of an example of an information processing system 800 such as the server system 104 of FIG. 1. In one embodiment, the information processing system 800 is a cloud computing node. Cloud computing node 800 is only one example of a suitable cloud computing node and is not intended to suggest any limitation as to the scope of use or functionality of embodiments of the invention described herein. Regardless, cloud computing node 800 is capable of being implemented and/or performing any of the functionality set forth hereinabove.

In the cloud computing node 800 there is a computer system/server 802, which is operational with numerous other general purpose or special purpose computing system environments or configurations. Examples of well-known computing systems, environments, and/or configurations that may be suitable for use with computer system/server 802 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 802 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 802 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, computer system/server 802 in cloud computing node 800 is shown in the form of a general-purpose computing device. The components of computer system/server 802 may include, but are not limited to, one or more processors or processing units 804, a system memory 806, and a bus 808 that couples various system components including system memory 806 to processor 804.

Bus 808 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 802 typically includes a variety of computer system readable media. Such media may be any available media that is accessible by computer system/server 802, and it includes both volatile and non-volatile media, removable and non-removable media.

System memory 806, in one embodiment, comprises a virtual machine 202 discussed above. The system memory 806 can include computer system readable media in the form of volatile memory, such as random access memory (RAM) 810 and/or cache memory 812. Computer system/server 802 may further include other removable/non-removable, volatile/non-volatile computer system storage media. By way of example only, storage system 814 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 808 by one or more data media interfaces. As will be further depicted and described below, memory 806 may include at least one program product having a set (e.g., at least one) of program modules that are configured to carry out the functions of embodiments of the invention.

Program/utility 816, having a set (at least one) of program modules 818, may be stored in memory 806 by way of example, and not limitation, as well as an operating system, one or more application programs, other program modules, and program data. Each of the operating system, one or more application programs, other program modules, and program data or some combination thereof, may include an implementation of a networking environment. Program modules 818 generally carry out the functions and/or methodologies of embodiments of the invention as described herein.

Computer system/server 802 may also communicate with one or more external devices 820 such as a keyboard, a pointing device, a display 822, etc.; one or more devices that enable a user to interact with computer system/server 802; and/or any devices (e.g., network card, modem, etc.) that enable computer system/server 802 to communicate with one or more other computing devices. Such communication can occur via I/O interfaces 824. Still yet, computer system/server 802 can communicate with one or more networks such as a local area network (LAN), a general wide area network (WAN), and/or a public network (e.g., the Internet) via network adapter 826. As depicted, network adapter 826 communicates with the other components of computer system/server 802 via bus 808. It should be understood that although not shown, other hardware and/or software components could be used in conjunction with computer system/server 802. Examples, include, but are not limited to: microcode, device drivers, redundant processing units, external disk drive arrays, RAID systems, tape drives, and data archival storage systems, etc.

Cloud Environment

It is understood in advance that although the following is a detailed discussion on cloud computing, implementation of the teachings recited herein are not limited to a cloud computing environment. Rather, various embodiments of the present invention are capable of being implemented in conjunction with any other type of computing environment now known or later developed. For example, various embodiments of the present invention are applicable to any computing environment with a virtualized infrastructure or any other type of computing environment.

For convenience, the Detailed Description includes the following definitions which have been derived from the "Draft NIST Working Definition of Cloud Computing" by Peter Mell and Tim Grance, dated Oct. 7, 2009, which is cited in an IDS filed herewith, and a copy of which is attached thereto. However, it should be noted that cloud computing environments that are applicable to one or more embodiments of the present invention are not required to correspond to the following definitions and characteristics given below or in the "Draft NIST Working Definition of Cloud Computing" publication. It should also be noted that the following definitions, characteristics, and discussions of cloud computing are given as non-limiting examples.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 9:
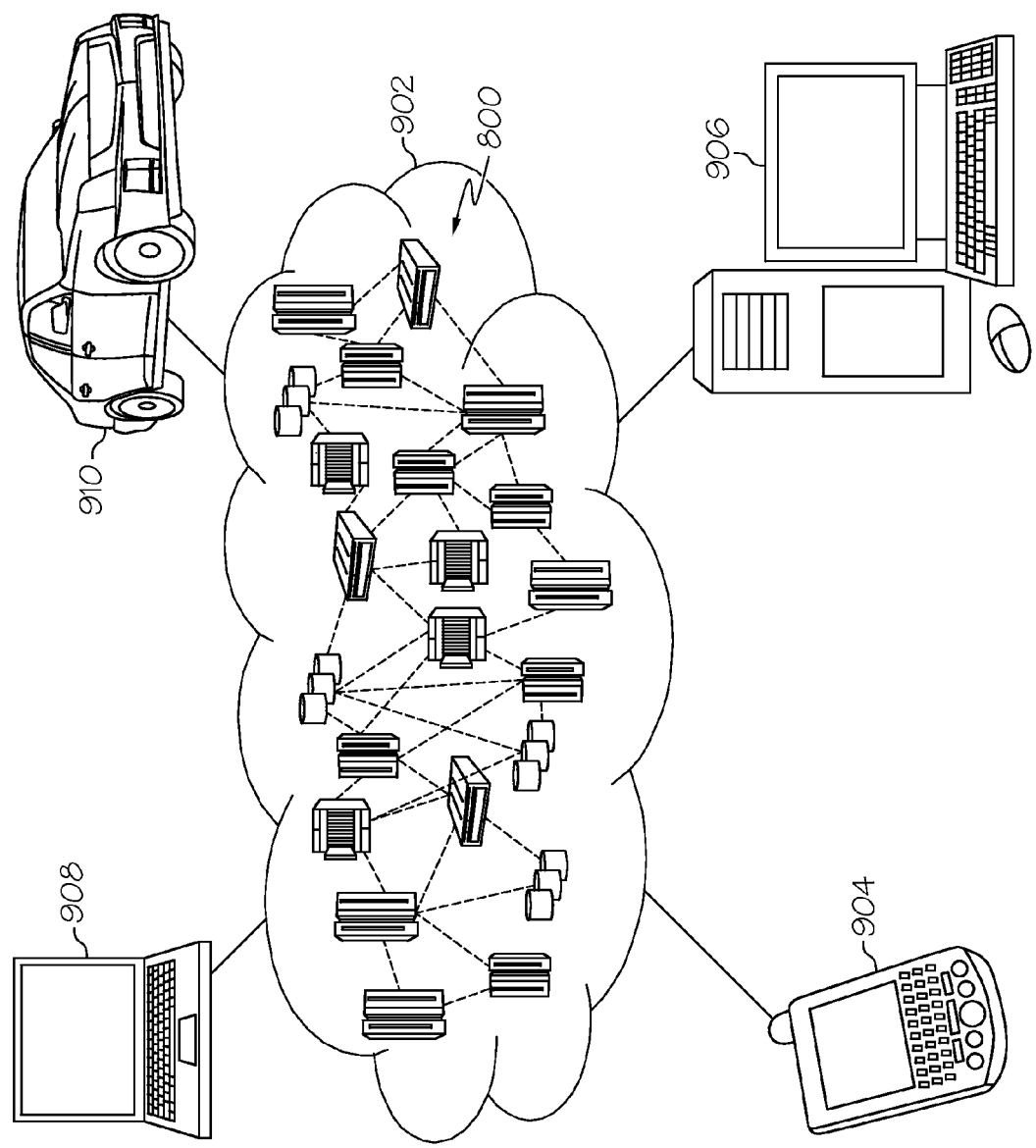
FIG. 9 illustrates one example of a cloud computing environment according to one embodiment of the present invention.

Referring now to FIG. 9, illustrative cloud computing environment 902 is depicted. As shown, cloud computing environment 902 comprises one or more cloud computing nodes 1600 with which local computing devices used by cloud consumers, such as, for example, personal digital assistant (PDA) or cellular telephone 904, desktop computer 906, laptop computer 908, and/or automobile computer system 910 may communicate. Nodes 904, 906, 908, 910 can communicate with one another. They may be grouped (not shown) physically or virtually, in one or more networks, such as Private, Community, Public, or Hybrid clouds as described hereinabove, or a combination thereof. This allows cloud computing environment 902 to offer infrastructure, platforms and/or software as services for which a cloud consumer does not need to maintain resources on a local computing device. It is understood that the types of computing devices 904, 906, 908, 910 shown in FIG. 9 are intended to be illustrative only and that computing nodes 800 and cloud computing environment 902 can communicate with any type of computerized device over any type of network and/or network addressable connection (e.g., using a web browser).

Figure 10:
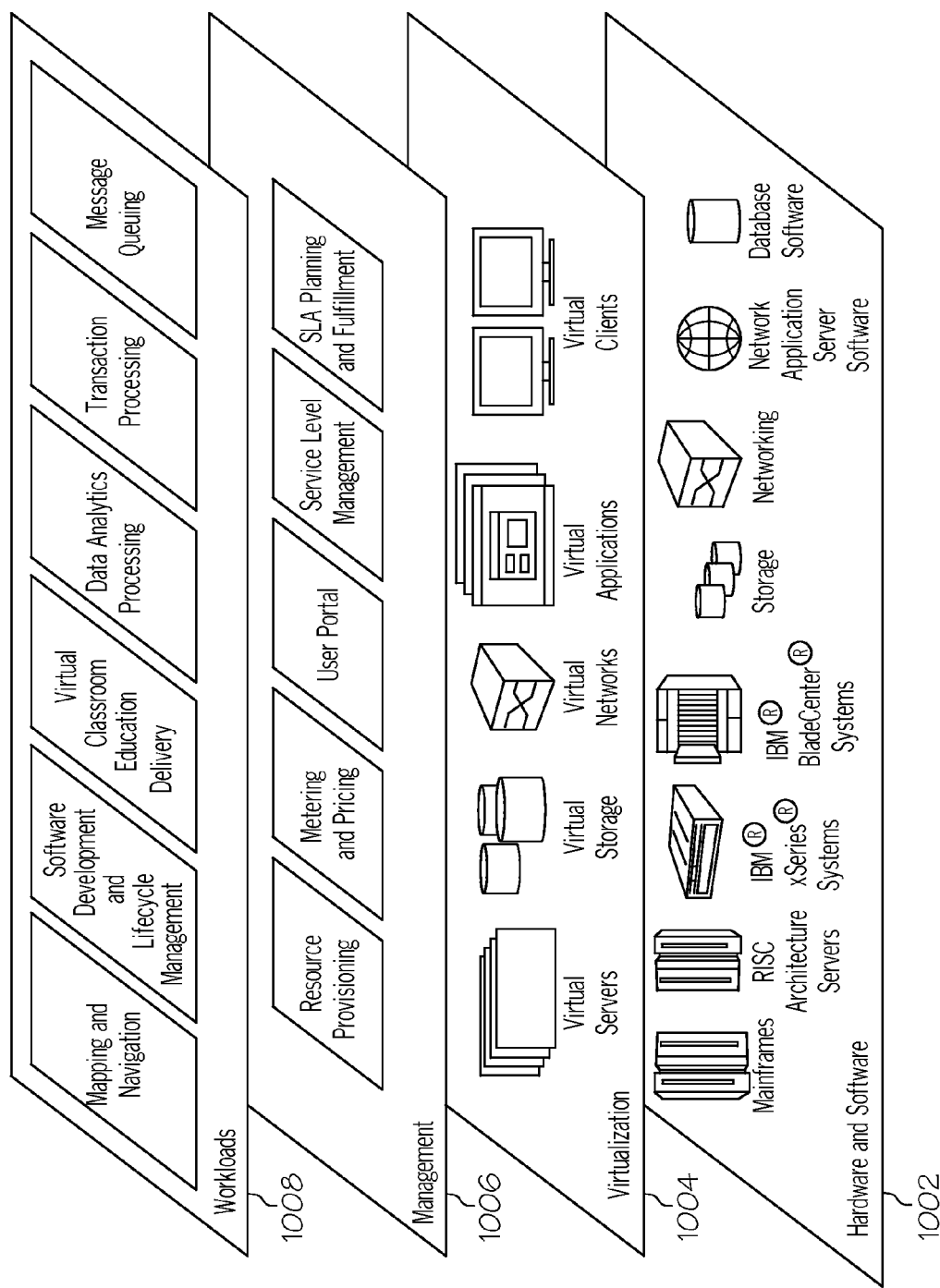
FIG. 10 illustrates abstraction model layers according to one embodiment of the present invention.

Referring now to FIG. 10, a set of functional abstraction layers provided by cloud computing environment 902 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 1002 includes hardware and software components. Examples of hardware components include mainframes, in one example IBM® System z® systems; RISC (Reduced Instruction Set Computer) architecture based servers, in one example IBM System p® systems; IBM System x® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide)

Virtualization layer 1004 provides an abstraction layer from which the following examples of virtual entities may be provided: virtual servers; virtual storage; virtual networks, including virtual private networks; virtual applications and operating systems; and virtual clients.

In one example, management layer 1006 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 1008 provides examples of functionality for which the cloud computing environment may be utilized. Examples of workloads and functions which may be provided from this layer include: mapping and navigation; software development and lifecycle management; virtual classroom education delivery; data analytics processing; transaction processing; and message queuing, as discussed above.

Non-Limiting Examples

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for managing message queuing, the method comprising:
   receiving a request from an application for retrieving a message from a queue stored across multiple nodes of a distributed storage system, wherein the queue has been created by a request that comprises a specified preference for the queue for a tradeoff between message order and message duplication, metadata corresponding to the specified preference for the queue being stored in the distributed storage system;
   identifying the preference associated with the queue with respect to the tradeoff between message order and message duplication;
   sampling a message sequence index associated with the queue based on the preference that has been identified;
   selecting, in response to the sampling, the message;
   making the message that has been selected unavailable to other applications for a given interval of time, while maintaining the message in the queue; and
   sending the message to the application.

2. The method of claim 1, wherein the sampling further comprises:
   calculating a positive integer K based on the preference that has been identified, where K=1 corresponds to a strong preference towards message order and K=+∞, which is indicated by K=a large integer value greater than a number of objects in the message sequence index, corresponds to a strong preference towards non-duplication.

3. The method of claim 2, wherein the sampling further comprises:
   responsive to calculating K to be K=+∞, sampling at least one random node in the distributed storage system for a message associated with the queue; and
   responsive to calculating K to be K<∞,
      sampling a random message reference from a first K objects in the message sequence index, and
      retrieving the message from the distributed storage system based on the random message reference that has been sampled.

4. The method of claim 1, further comprising:
   receiving, after sending the message to the application and prior to the given interval of time having expired, a request to delete the message from the queue; and
   permanently removing the message from the distributed storage system.

5. The method of claim 1, further comprising:
   determining that the given interval of time has expired prior to receiving a request from the application to delete the message; and
   making the message that has been sent to the application available to other applications.

6. The method of claim 1, wherein making the message that has been selected unavailable to other applications for a given interval of time comprises:
   updating a timestamp associated with the message based on the given interval of time, where the message is unavailable until a future point in time corresponding to the timestamp that has been updated.

7. The method of claim 1, wherein selecting the message comprises:
   analyzing a timestamp associated with the message;
   determining if the timestamp identifies a future point in time;
   responsive to the timestamp identifying a future point in time determining that the message is unavailable; and
   responsive to the timestamp identifying one of a current point in time and a past point in time, determining that the message is available.

8. The method of claim 1, wherein the message sequence index is a list of tuples in the form of (id, handle, timestamp), where id is an identifier of a message, handle is a unique number associated with the message, and timestamp is a time that the message is available for retrieval.

9. The method of claim 1, wherein the value of the specified preference stored as metadata in the distributed storage system is a configurable parameter for the queue, the value of the parameter being exposed by the distributed storage system and configurable by a client of the distributed storage system.

10. A message queuing system, the message queuing system comprising:
    a distributed storage system comprising; and
    at least one information processing system communicatively coupled to the distributed storage system, the at least one information processing system comprising memory, a processor, and a messaging queuing system configured to perform a method comprising:
       receiving a request from an application for retrieving a message from a queue stored across multiple nodes of the distributed storage system, wherein the queue has been created by an application request that comprises a specified preference for the queue for a tradeoff between message order and message duplication, metadata corresponding to the specified preference for the queue being stored in the distributed storage system;
       identifying a preference associated with the queue with respect to message order and message duplication;
       sampling a message sequence index associated with the queue based on the preference that has been identified;
       selecting, in response to the sampling, the message;
       making the message that has been selected unavailable to other applications for a given interval of time, while maintaining the message in the queue; and
       sending the message to the application.

11. The message queuing system of claim 10, wherein the sampling further comprises:
    calculating a positive integer K based on the preference that has been identified, where K=1 corresponds to a strong preference towards message order and K=∞ which is indicated by K=a large integer value greater than a number of objects in the message sequence index, corresponds to a strong preference towards non-duplication;
    responsive to calculating K to be K=+∞, sampling at least one random node in the distributed storage system for a message associated with the queue; and
    responsive to calculating K to be K<∞,
       sampling a random message reference from a first K objects in the message sequence index, and
       retrieving the message from the distributed storage system based on the random message reference that has been sampled.

12. The message queuing system of claim 10, wherein the method performed by the message queuing system further comprises:

determining that the given interval of time has expired prior to receiving a request from the application to delete the message; and making the message that has been sent to the application available to other applications.

13. The message queuing system of claim 10, wherein making the message that has been selected unavailable to other applications for a given interval of time comprises:

updating a timestamp associated with the message based on the given interval of time, where the message is unavailable until a future point in time corresponding to the timestamp that has been updated.

14. The message queuing system of claim 10, wherein selecting the message comprises:

analyzing a timestamp associated with the message;

determining if the timestamp identifies a future point in time;

responsive to the timestamp identifying a future point in time determining that the message is unavailable; and responsive to the timestamp identifying one of a current point in time and a past point in time, determining that the message is available.

15. A computer program product for managing message queuing, the computer program product comprising a non-transitory computer readable storage medium having computer readable program code embodied therewith, the computer readable program code comprising computer readable program code configured to perform a method comprising:

receiving a request from an application for retrieving a message from a queue stored across multiple nodes of the distributed storage system, wherein the queue has been created by an application request that comprises a specified preference for the queue for a tradeoff between message order and message duplication, metadata corresponding to the specified preference for the queue being stored in the distributed storage system;

identifying a preference associated with the queue with respect to message order and message duplication;

sampling a message sequence index associated with the queue based on the preference that has been identified;

selecting, in response to the sampling, the message;

making the message that has been selected unavailable to other applications for a given interval of time, while maintaining the message in the queue; and sending the message to the application.

16. The computer program product of claim 15, wherein the sampling further comprises:

calculating a positive integer K based on the preference that has been identified, where K=1 corresponds to a strong preference towards message order and K=+∞ which is indicated by K=a large integer value greater than a number of objects in the message sequence index, corresponds to a strong preference towards non-duplication.

17. The computer program product of claim 16, wherein the sampling further comprises:

responsive to calculating K to be K=+∞, sampling at least one random node in the distributed storage system for a message associated with the queue; and responsive to calculating K to be K<∞, sampling a random message reference from a first K objects in the message sequence index, and retrieving the message from the distributed storage system based on the random message reference that has been sampled.

18. The computer program product of claim 15, wherein the method performed by the computer readable program code further comprises:

determining that the given interval of time has expired prior to receiving a request from the application to delete the message; and making the message that has been sent to the application available to other applications.

19. The computer program product of claim 15, wherein making the message that has been selected unavailable to other applications for a given interval of time comprises:

updating a timestamp associated with the message based on the given interval of time, where the message is unavailable until a future point in time corresponding to the timestamp that has been updated.

20. The computer program product of claim 15, wherein selecting the message comprises:

analyzing a timestamp associated with the message;

determining if the timestamp identifies a future point in time;

responsive to the timestamp identifying a future point in time determining that the message is unavailable; and responsive to the timestamp identifying one of a current point in time and a past point in time, determining that the message is available.

\* \* \* \* \*